Patented Apr. 26, 1949

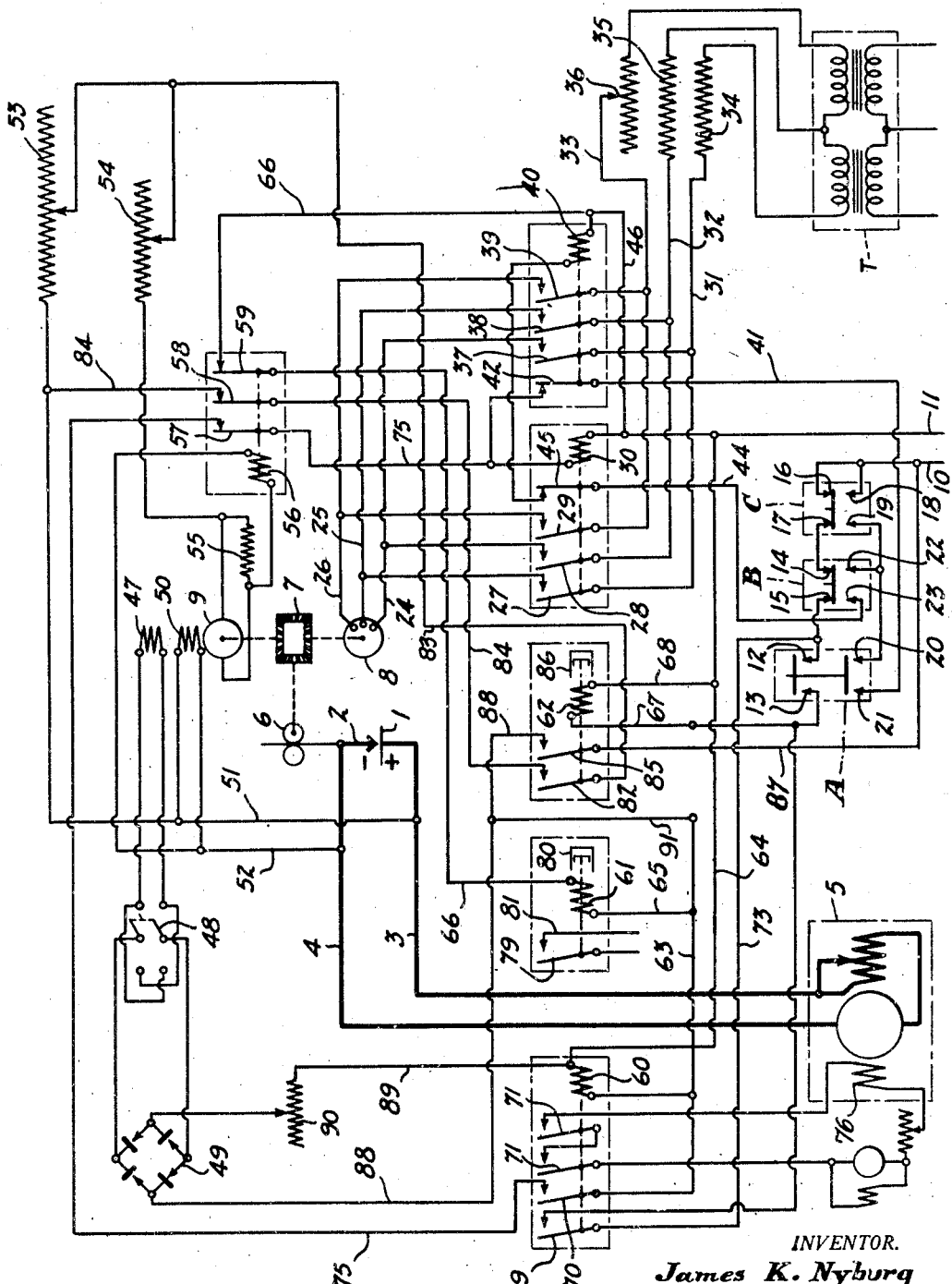

2,468,570

UNITED STATES PATENT OFFICE 2,468,570

ARC WELDING MACHINE

James K. Nyburg, East Cleveland, Ohio, assignor, by mesne assignments, to General Electric Company, a corporation of New York Application May 10, 1946, Serial No. 668,739

19 Claims. (Cl. 314—62)

This invention relates to arc welding machines of the type having a differentially driven electrode feeding mechanism operated by two drivers through a differential and automatically controlled by the welding circuit to maintain a substantially uniform arc during welding operations.

The invention has for an object to provide an automatic welding machine of the character described with a control panel in which all of the electrical control elements are energized by relatively low currents, thereby avoiding the heavy conductors and expensive construction necessary when control elements are directly subjected to the current flowing through the welding circuit.

A further object is to provide a superior control for the operating motors which is positive and certain in its operation and which eliminates freezing of the electrode to the work and in which difficulty in striking the arc is eliminated, making it unnecessary to use steel wool between the electrode and work in starting.

In concealed arc welding where the electrode extends into a body of flux covering the joint to be welded it has been found to be advantageous to start the operation with the electrode engaging the work.

It is an object of this invention to provide an electrode feed mechanism which will automatically strike and maintain the arc regardless of whether the machine is started into operation with the electrode in contact with the work or out of contact with the work, thereby providing a machine that is equally efficient for either open arc welding or concealed arc welding.

A further object is to provide improved manually controlled means for adjusting and regulating the arc during the operation of the machine.

An additional object is to provide an auxiliary manually operable means for controlling one of the drivers to operate the same intermittently to inch the electrode toward or away from the work while the welding circuit is deenergized.

With the above and other objects in view, the invention may be said to comprise the welding machine as illustrated in the accompanying drawing, hereinafter described and particularly set forth in the appended claims, together with such variations and modifications thereof as will be apparent to one skilled in the art to which the invention pertains.

Reference should be had to the accompanying drawing forming a part of this specification, which is a wiring diagram illustrating the invention.

In the accompanying drawing, the work is shown diagrammatically at 1 and the electrode is shown diagrammatically at 2. The electrode is movable toward and away from the work and either the electrode or the work may be mounted upon a suitable traveling fixture to move the arc along the surface of the work as is common practice in the art. The work 1 and electrode 2 are shown connected by lines 3 and 4 to the terminals of a welding generator 5 which supplies the welding current. A feed mechanism is provided for the electrode 2 having suitable means such as rollers 6 for moving the electrode toward or away from the work. The feed mechanism of the present invention is of the differential drive type shown in the patent to Burgett 2,079,956, granted May 11, 1937, in which the electrode feeding means is driven through a differential which is operated by two drivers, one operating in a direction to feed the electrode toward the work and the other in a direction to feed the electrode away from the work.

As herein shown, the electrode feed rollers 6 are driven by a differential 7 which is operated by two motors 8 and 9 which drive the balanced gears of the differential in opposite directions. The motor 8 is driven in a direction to feed the electrode away from the work when it rotates faster than the motor 9 and is herein referred to as the up motor, while the motor 9 is driven in a direction to feed the electrode toward the work when it rotates faster than the motor 8, and is referred to herein as the down motor. One of the motors, preferably the up motor 8 is a motor of constant speed characteristics, and it may be a three phase alternating current motor of the squirrel cage type. One of the motors, preferably the down motor 9 is a motor of variable speed characteristics and this motor, which is preferably a direct current motor, is controlled by the welding circuit so that its speed is varied in accordance with variations in the voltage across the arc, to automatically maintain the electrode at the proper distance from the work during welding.

The starting and stopping of the motors is controlled manually through a suitable control circuit and one of the motors, preferably the up motor 8, is adapted to be controlled manually while the welding circuit is deenergized, to inch the electrode 2 toward or away from the work as desired. The adjusting or inching operation is controlled by an auxiliary control circuit which is interlocked with the main welding control circuit through suitable switches.

Three manually operable control switches A, B, and C are utilized to control the welding and inching operations. The switch A is the starting switch for the welding control circuit, which is connected across power lines 10 and 11 which may be in the usual 110 volt, 60 cycle lighting circuit. The switch A, which is of the push button type and normally open, bridges contacts 12 and 13 in the main control circuit to start the welding operation. Switch B is a circuit breaker which serves as the stopping switch for the welding control circuit and is a switch of the push button type which is normally positioned to bridge contacts 14 and 15 which are in series with the contacts 12 and 13 bridged by the starting switch A. The switch C is a three position master switch that is adapted to be positioned in a neutral position, in a position bridging contacts 16 and 17 in series with the contacts 12, 13, 14 and 15 of the main control circuit, or in a position bridging contacts 18 and 19 which are located in the electrode adjusting control circuit. The switch A is a double switch that bridges a pair of contacts 20 and 21 in the auxiliary inching control circuit at the same time that it bridges the contacts 12 and 13 in the main control circuit, the contacts 20 and 21 being in series with the contacts 18 and 19. The switch B is movable from a position bridging contacts 14 and 15 in the main control circuit to a position bridging a pair of contacts 22 and 23 in the auxiliary control circuit which are in series with the contacts 18 and 19 and parallel with contacts 20 and 21. When the master switch C is engaged with the contacts 16 and 17, the welding control circuit may be energized by closing the switch A which will permit current to flow through switches A, B, and C. When the master switch C engages the contacts 18 and 19, closing of the switch A will establish a current path through the switches A and C and when the switch B is moved into engagement with contacts 22 and 23, current flows through switches B and C. When the welding control circuit is made operative by adjustment of the switch C into engagement with contacts 16 and 17, the switch A is operated to start the machine in operation and the switch B is operated to stop the machine. When the switch C is engaged with contacts 18 and 19 the switch A is operable to cause feed of the electrode in one direction and the switch B is operable to cause feed of the electrode in the opposite direction, as will be hereinafter more fully explained.

Three lines, 24, 25 and 26 are connected to the alternating current motor 8 and current is supplied to these lines to operate the motor in the up direction through switches 27, 28 and 29, which are operated by a relay 30 which is adapted to be energized by either of the control circuits. The switches 27, 28 and 29 are connected to the terminals of a suitable stepdown transformer T by lines 31, 32 and 33 and when closed connect the lines 31, 32 and 33 to lines 25, 24 and 26 respectively. The line 31 has a resistance 34 therein, the line 32 has a resistance 35 and the line 33 has a resistance 36. One of the three resistances is adjustable to vary the pickup of the motor 8. As herein shown, the resistance 36 in the line 33 is an adjustable resistance which may be manually adjusted to vary the rate of acceleration of the motor 8 in starting.

The lines 24, 25 and 26 may also be connected to lines 31, 32 and 33 by means of switches 37, 38 and 39, operated by a relay 40 that can be energized only by the electrode adjusting control circuit. The switches 37, 38 and 39 connect the lines 24, 25 and 26 to lines 31, 32 and 33 to operate the motor in a direction to feed the electrode 2 downwardly toward the work.

Means is provided to positively prevent simultaneous energization of the relays 30 and 40. The contact 21 in the auxiliary control circuit which can be connected through the switches A and C to power line 10 and through which current passes when the switch A engages the contacts 20 and 21, is connected by a line 41 through a normally closed safety switch 42 to one terminal of the relay 30 and the opposite terminal of the relay 30 is connected to the power line 11. The normally closed switch 42 is opened upon energization of the relay 40 to prevent operation of the relay 30 while the relay 40 is energized. A line 44 connects the contact 23 of switch B with a normally closed switch 45 through which the line 10 of the power circuit may be connected to one terminal of the relay 40, the opposite terminal of the relay 40 being connected by a line 46 to the power line 11. The safety switch 45 is held open by the relay 30 while this relay is energized, so that the relay 40 cannot be energized.

With the master switch C in engagement with the contacts 18 and 19, movement of the switch A into engagement with contacts 20 and 21 will complete a circuit through the up relay 30, actuating the switches 27, 28 and 29 to operate the motor A in a direction to feed the electrode 2 up or away from the work. The switch A may be intermittently and momentarily engaged with the contacts 20 and 21 to inch the electrode 2 away from the work to the desired position with respect to it. The switch B may likewise be intermittently and momentarily engaged with contacts 22 and 23 to intermittently energize the relay 40 and operate the motor 8 in the reverse direction to inch the electrode down toward the work.

The main control circuit has means controlling the energization of the welding circuit and of circuits controlling the motors, the manually operable switches A and B being operable to start and stop the welding operation.

The down motor 9 has a constant potential shunt wound field winding 47 that is connected through a reversing switch 48 to terminals of a bridge type rectifier 49 which serves to receive alternating current from the power lines 10 and 11 and to deliver direct current through the winding 47. The reversing switch 48 is employed to place the shunt field of the down motor into proper potential relationship to the voltage impressed upon the armature of the motor 9 and operates to reverse the polarity on motor armature, this adjustment being made while the welding circuit is deenergized. The reversing of the voltage on the armature is desirable when the motor has a bucking field and the down motor should be tested occasionally before starting welding operations by plugging in first one field and then the other and operating the motor. Normally the motor should feed the electrode down with a field plugged in. If, however, the motor operates in a reverse direction and feeds the electrode up when one of the fields is plugged in, the reversing switch should be operated to reverse the polarity of the field.

The winding 47 is the main field winding of the motor 9, but this motor has auxiliary shunt wound field winding 50 which receives a varying current from the welding circuit to control the speed of operation of the motor 9 during weld- An adjustable resistance 90 is provided in the primary of the rectifier 49 and this resistance is manually adjustable to vary the current supplied to the constant potential field 47 to effect an increase or decrease in the speed of the down motor 9, as may be desirable to obtain proper control of the arc.

When the machine is being used for open arc welding, the electrode 2 is ordinarily adjusted to a position spaced from the work before the machine is started into operation. For concealed arc welding where the arc between the electrode and work is within a body of a flux applied to the surface being welded, the machine is started into operation with the electrode touching the work.

When the electrode is spaced from the work and the control relays are energized by the operation of the push button A, there is a surge of current through the armature and shunt winding 50 of the down motor 9 and through the current relay 56 in series with the armature. The surge of current through the relay 56 opens the switches 57, 58 and 59. The opening of the switch 57 deenergizes the relay 30 of the up motor 8 to prevent operation of the up motor. The opening of the switch 58 inserts the resistance 53 in series with the armature of the down motor to cut down the speed of the down motor during the initial electrode feeding operation. The opening of the switch 59 prevents operation of the fixture drive so that the work remains stationary with respect to the electrode until after the arc is established.

When the electrode engages the work, the current through the relay 56 is reduced and the relay is deenergized so that the switches 57, 58 and 59 are permitted to close. The closing of the switch 57 completes the circuit through the up relay 30, starting the motor 8 into operation. At the same time the closing of the switch 58 short circuits the resistance 53 so that a smaller proportion of the current from the welding circuit passes through the field winding 50 and the speed of the down motor is increased so that the upward movement of the electrode due to the initial operation of the motor 8 is arrested before the electrode has moved far enough to break the arc. When the arc is established the relay 61 will be energized by the closing of the switch 59 and the switch 79 will be closed after an interval of time determined by the setting of the timer 80 so as to start movement of the fixture after the welding operation has started.

The adjustable resistance 54, which may be in the form of a rheostat, remains in series with the armature of the motor 9 and may be adjusted during the welding operation to change the proportion of the current flowing through the auxiliary shunt field winding 50 and regulate the sensitivity of the automatic speed control. The manually adjustable resistance 90 may also be in the form of a rheostat which may be adjusted to increase or decrease the speed of the down motor. By means of the two adjustable resistances 54 and 90 the arc may be accurately controlled, the adjustable resistance 90 serving to increase or decrease the speed of the down motor by definite amounts and the resistance 54 serving to regulate the action of the fluctuating current on the motor to increase or decrease the effect of variations in the potentials across the arc on the speed of the motor.

It is to be understood that variations and modifications of the specific devices herein shown and described for purposes of illustration, may be made without departing from the spirit of the invention.

What I claim is:

1. An arc welding machine having a welding circuit for supplying current to an arc through an electrode, electrode feeding means, means for driving said feeding means comprising an up driver, a down driver and a differential gearing between said drivers and said feeding means, manually operable means for controlling energization of said welding circuit and operation of said drivers, means responsive to variations in voltage across the arc for varying the speed of one of said drivers, a relay connected across said welding circuit and the arc established therein and responsive in its operation to a current flow therethrough which is in excess of that which normally flows therethrough as a result of its connection across the arc, and means responsive to the operation of said relay for controlling operation of said up driver.

2. An arc welding machine having a welding circuit for supplying current to an arc through an electrode, electrode feeding means, means for driving said feeding means comprising an up driver, a down driver and a differential gearing between said drivers and said feeding means, manually operable means for controlling energization of said welding circuit and operation of said drivers, means responsive to variations in voltage across the arc for varying the speed of one of said drivers, a relay connected across said welding circuit and the arc established therein and responsive in its operation to a current flow therethrough which is in excess of that which normally flows therethrough as a result of its connection across the arc, and means responsive to the operation of said relay for changing the speed of a driver.

3. An arc welding machine having a welding circuit for supplying current to an arc through an electrode, electrode feeding means, means for driving said feeding means comprising an up driver, a down driver and a differential gearing between said drivers and said feeding means, manually operable means for controlling energization of said welding circuit and operation of said drivers, means responsive to variations in voltage across the arc for varying the speed of one of said drivers, a relay connected across said welding circuit and the arc established therein and responsive in its operation to a current flow therethrough which is in excess of that which normally flows therethrough as a result of its connection across the arc, and means responsive to the operation of said relay for changing the speed of said down driver and for controlling operation of said up driver.

4. An arc welding machine having a welding circuit for supplying current to an arc through an electrode, electrode feeding means, means for driving said feeding means comprising an up driver, a down driver and a differential gearing between said drivers and said feeding means, a control circuit having a manually operable starting switch, means in said circuit for controlling energization of said welding circuit and operation of said drivers, a relay connected across said welding circuit and the arc established therein and responsive in its operation to a current flow therethrough which is in excess of that which normally flows therethrough as a result of its connection across the arc, and means responsive ing operation. The field winding 50 is connected across the arc by means of a line 51 connected to the line 3 of the welding circuit and a line 52 connected to the line 4 of the welding circuit, the lines 51 and 52 being connected to opposite terminals of the winding 50. The armature of the down motor 9 is also connected across the arc in parallel with the field winding 50, the line 51 being connected to one terminal of the armature and the line 52 being connected to the opposite terminal of the armature.

Two adjustable resistances 53 and 54 are positioned in the line 51 in series with the motor armature and in parallel with the field winding 50. A fixed resistance 55 is connected across the terminals of the armature of the motor 9 in series with the resistances 53 and 54 and a current relay 56 is provided in the line 52 in series with the resistance 55 and the armature of the motor 9. The relay 56 is of the type that is energized for operation only when the current flowing through it is in excess of a predetermined amount. Since the lines 51 and 52 are connected across the arc, it will be apparent that the current flowing through these lines will increase as the resistance to flow of current from the electrode to the work increases, and will decrease as the resistance to flow of current between the electrode and the work decreases. It will also be apparent that if the welding circuit is energized with the electrode 2 spaced from the work 1, the lines 51 and 52 will receive a surge of current from the welding circuit. The relay 56 is a current relay that requires for its operation due to energization a current in excess of that which normally flows through it during the welding operation but which is adapted to be operated by a surge of current from the welding circuit when the welding circuit is energized with the electrode out of engagement with the work or when the arc is broken, and this relay when energized for operation opens three normally closed switches 57, 58 and 59 in the main control circuit. The switch 57 when open prevents operation of the up relay 30 controlling the motor 8. The switch 58 when closed short circuits the adjustable resistance 53. When the welding circuit is energized with the electrode 2 spaced from the work, the switch 57 is opened to prevent starting of the up motor prior to engagement of the electrode with the work, and the switch 58 is opened to insert the resistance 53 in series with the armature of the motor 9 to slow down the motor during the initial feed of the electrode toward the work. The switch 59 when opened prevents energization of a circuit controlling the operation of the fixture drive to prevent movement of the traveling fixture until after the arc is established.

The motor 8 is controlled by the main control circuit through the relay 30 which is connected in the main control circuit when this circuit is made operative by positioning the master switch C in engagement with contacts 16 and 17.

Three additional relays, 60, 61, and 62 are also provided in the main control circuit. The relay 60 is connected to the power line 10 through the lines 87, 88, 91 and 63 at one of its terminals and by a line 64 connecting its opposite terminal to the line 11. A line 65 connects the line 63 to the relay 61 which is connected by a line 66 through the switch 59 to the power line 11. The relay 62 is connected at one of its terminals through the lines 68 and 64 to the power line 11 and at its other terminal through the line 67 to contact 13 of the switch A.

The relay 60 operates normally open switches 69, 70 and 71. The switch 69 is a holding switch connected by a line 73 to the line between the switches A and B and by a line 74 to the line 67 between the switch A and the relay 62. When the switch A is momentarily closed current through the relay 62 closes the switch 85 and current then flows through the lines 87, 88, 91 and 63 to the relay 60, causing the switch 69 to close thereby and through the line 64 to the power line 11, maintaining energization of the relays 60, 61, and 62 after opening of the switch A.

The relays 60 and 62 are controlled solely by the switches A and B and remain energized until the control circuit is deenergized. So long as switch 85 of relay 62 remains closed, the relay 61, however, may be deenergized and reenergized by the opening and closing of the switch 59 that is operated by the current relay 56.

The up relay 30 is connected to the power line 10 through a line 75 which includes the normally closed switch 57 controlled by the relay 56 and the normally open switch 70 controlled by the relay 60. The switch 71 of relay 60 is a double switch controlling energization of the welding circuit by the welding generator 5 through a circuit including a shunt field winding 76 of the generator 5.

The relay 61 when energized closes a normally open switch 79 in a fixture drive control circuit 81 to start movement of the fixture to cause the desired travel between the electrode and the work, the switch 79 being provided with a timer 80 to delay the closing thereof so that the fixture will not begin to move until an interval after the arc is established between the electrode and the work sufficient to effect the desired heating of the work at the starting point.

The relay 62 when energized closes a normally open switch 82 that is connected by a line 83 to the line 51 between the resistances 53 and 54 and by a line 84 through the switch 58 to the line 51 between the resistance 53 and the field winding 50 of the down motor, the switches 82 and 58 serving when both are closed to short circuit the resistance 53 and speed up the down motor 9. The relay 62 also operates to close a normally open switch 85 that is provided with a timer 86 to delay its opening, the switch 85 being connected to the power line 10 by a line 87 and to one terminal of the rectifier 49 by a line 88. The opposite terminal of the rectifier 49 is connected to the line 11 through a line 89 and the line 64. The switch 85 controls the supply of current to the constant potential field winding 47 of the motor 9 and serves to start the motor 9 into operation when the control circuit is energized by means of the push button switch A.

The push button B which is located between the connection of the line 73 with the power line 10 serves to break the circuit through the relays of the main power control circuit and stop the machine. The delay timer 86 serves to delay the stopping of the welding operation for a short time after the opening of the circuit by actuation of the push button switch B. The switches 85 and 57 serve to hold through line 91 the circuits of relays 60 and 30 until the switch 85 is opened by the timer. The stopping switch B is depressed and held in circuit breaking position until the switch 85 opens to stop the operation of the machine.

to the operation of said relay for controlling one of said drivers.

5. An arc welding machine having a welding circuit for supplying current to an arc established between a welding electrode and the work connected in said welding circuit, electrode feeding means, means for driving said feeding means comprising an up driver, a down driver and a differential gearing between said drivers and said feeding means, a control circuit having a manually operable starting switch, means in said circuit for controlling energization of said welding circuit and operation of said drivers, a relay connected across the electrode and the work in said welding circuit and responsive in its operation to a current flow therethrough which is in excess of that which normally flows therethrough as a result of its connection across the arc, and means responsive to the operation of said relay for delaying the operation of said up driver when the starting switch is operated with the electrode spaced from the work.

6. An arc welding machine having a welding circuit for supplying current to an arc through an electrode, electrode feeding means, means for driving said feeding means comprising an up driver, a down driver and a differential gearing between said drivers and said feeding means, a control circuit having a manually operable starting switch, means in said circuit for controlling energization of said welding circuit and operation of said drivers, a relay connected across said welding circuit and the arc established therein and responsive in its operation to a current flow therethrough which is in excess of that which normally flows therethrough as a result of its connection across the arc, and means responsive to the operation of said relay for controlling one of said drivers and for changing the speed of the other of said drivers.

7. An arc welding machine having a welding circuit for supplying current to an arc through an electrode, an electrode feed mechanism including an up motor, a down motor and a differential, manually operable means for controlling energization of said welding circuit and said motors, means responsive to variations in the voltage across the arc for varying the speed of said down motor, and means for delaying the energization of said up motor comprising a relay connected across said welding circuit and the arc established therein and responsive in its operation to a current flow therethrough which is in excess of that which normally flows therethrough as a result of its connection across the arc.

8. An arc welding machine having a welding circuit for supplying current to an arc through an electrode, an electrode feed mechanism including an up motor, a down motor and a differential, means for energizing said welding circuit and said motors, a relay connected across said welding circuit and the arc established therein and responsive in its operation to a current flow therethrough which is in excess of that which normally flows therethrough as a result of its connection across the arc, means responsive to the operation of said relay for opening the circuit of said up motor, and means responsive to changes in voltage across the arc for varying the speed of one of said motors.

9. An arc welding machine having a welding circuit for supplying current to an arc through an electrode, an electrode feed mechanism including an up motor, a down motor and a differential, manually operable means for controlling energization of said welding circuit and said motors, means responsive to variations in the voltage across the arc for varying the speed of one of said motors, a relay connected across said welding circuit and the arc established therein and responsive in its operation to a current flow therethrough which is in excess of that which normally flows therethrough as a result of its connection across the arc, and means responsive to the operation of said relay for deenergizing said up motor and for changing the speed of said down motor.

10. An arc welding machine having a welding circuit for supplying current to an arc through an electrode, an electrode feed mechanism including an up motor, a down motor and a differential, a control circuit having a manually operable closing switch, means operated by said circuit for energizing said welding circuit and said motors, means responsive to variations in voltage across the arc for varying the speed of one of said motors, a relay connected across said welding circuit and the arc established therein and responsive in its operation to a current flow therethrough which is in excess of that which normally flows therethrough as a result of its connection across the arc, and means responsive to the operation of said relay for deenergizing said up motor.

11. An arc welding machine having a welding circuit for supplying current to an arc established between a welding electrode and the work connected in said welding circuit, an electrode feed mechanism having a drive including a differential and an up motor and a down motor balanced through said differential, a control circuit having a starting switch, means operated by said control circuit for controlling said welding circuit and said motors, means responsive to variations in the voltage across the arc for varying the speed of one of said motors, an up motor control switch biased to motor operating position, and a relay connected across the electrode and the work in said welding circuit and operable to open said control switch and deenergize said up motor in response to a current flow therethrough which is in excess of that which flows therethrough when an arc is established between the electrode and the work, the energization of said relay being insufficient to open said control switch when the electrode and the work are in engagement with one another.

12. An arc welding machine having a welding circuit for supplying current to an arc established between a welding electrode and the work connected in said welding circuit, an electrode feed mechanism having a drive including a differential and an up motor and a down motor balanced through said differential, a control circuit having a starting switch, means operated by said control circuit for controlling said welding circuit and said motors, means responsive to variations in the voltage across the arc for varying the speed of one of said motors, a switch controlling energization of the up motor, means including a switch for effecting a change in the speed of the down motor, and means including a relay connected across the electrode and the work in said welding circuit for operating said switches to deenergize the up motor and slow up the down motor when the welding circuit is broken between the work and electrode.

13. An arc welding machine having a welding circuit for supplying current to an arc through an electrode, an electrode feed mechanism including a differential, an up motor and a down motor, a work fixture driving means, motor circuits, a fixture drive control circuit, a main control circuit having a starting switch, means operated by said main control circuit for energizing said welding circuit, said motor circuits and said fixture drive control circuit, a relay connected across said welding circuit and the arc established therein and responsive in its operation to a current flow therethrough which is in excess of that which normally flows therethrough as a result of its connection across the arc, and means responsive to the operation of said relay for deenergizing said up motor control circuit and said fixture drive control circuit.

14. An arc welding machine having a welding circuit for supplying current to an arc through an electrode, an electrode feed mechanism including a differential, an up motor and a down motor, said up motor having its armature and a shunt wound field winding connected across the arc, a control circuit having a starting switch, means operated by said control circuit for energizing said welding circuit and said up motor, a relay connected in series with said down motor armature across said welding circuit and the arc established therein and responsive in its operation to a current flow therethrough which is in excess of that which normally flows therethrough as a result of its connection across the arc, and means responsive to the operation of said relay for deenergizing said up motor.

15. An arc welding machine having a welding circuit for supplying current to an arc through an electrode, an electrode feed mechanism including a differential, an up motor and a down motor, said up motor having its armature and a shunt wound field winding connected across the arc, a control circuit having a starting switch, means operated by said control circuit for energizing said welding circuit and said up motor, a resistance in series with said down motor armature, a relay connected in series with said resistance and said armature of said down motor across said welding circuit and the arc established therein and responsive in its operation to a current flow therethrough which is in excess of that which normally flows therethrough as a result of its connection across the arc, and means responsive to the operation of said relay for deenergizing said up motor and for short circuiting said resistance.

16. An arc welding machine having a welding circuit for supplying current to an arc through an electrode, electrode feeding means, means for driving said feeding means comprising an up motor, a down motor and a differential connecting said motors to said feeding means, said down motor having a separately excited field winding and having its armature and a shunt wound field winding connected across the arc in said welding circuit, a control circuit having a starting switch, means operated by said control circuit for energizing said welding circuit, said separately excited field winding and said up motor, a relay connected in series with the armature of said down motor across said welding circuit and the arc established therein and responsive in its operation to a current flow therethrough which is in excess of that which normally flows therethrough as a result of its connection across the arc, and means responsive to the operation of said relay for deenergizing said up motor.

17. An arc welding machine having a welding circuit for supplying current to an arc through an electrode, electrode feeding means, means for driving said feeding means comprising an up motor, a down motor and a differential connecting said motors to said feeding means, said down motor having a separately excited field winding and having its armature and a shunt wound field winding connected across the arc in said welding circuit, a control circuit having a starting switch, means operated by said control circuit for energizing said welding circuit, said separately excited field winding and said up motor, a relay connected in series with the armature of said down motor across said welding circuit and the arc established therein and responsive in its operation to a current flow therethrough which is in excess of that which normally flows therethrough as a result of its connection across the arc, and means responsive to the operation of said relay for changing the speed of said down motor and for deenergizing said up motor.

18. An electrode control mechanism for arc welding machines of the differential drive type having a variable speed down motor and a constant speed up motor operating through said differential drive to feed an electrode toward and away from the work, means responsive to changes in voltage across the arc for varying the speed of said variable speed motor, means for energizing said motors and for controlling operation of said constant speed motor, said means including a relay connected across said welding circuit and the arc established therein and responsive in its operation to a current flow therethrough which is in excess of that which normally flows therethrough as a result of its connection across the arc.

19. An electrode control mechanism for arc welding machines of the differential drive type having a variable speed down motor and a constant speed up motor operating through said differential drive to feed an electrode toward and away from the work, means responsive to changes in voltage across the arc for varying the speed of said variable speed motor, a current relay connected across the arc and responsive in its operation to a current flow therethrough which is in excess of that which normally flows therethrough as a result of its connection across the arc, and means responsive to the operation of said relay for deenergizing said up motor and for changing the speed of said down motor.

JAMES K. NYBURG.

REFERENCES CITED

The following references are of record in the file of this patent:

UNITED STATES PATENTS

| Number | Name | Date |
|---|---|---|
| 1,374,404 | Soons et al. | Apr. 12, 1921 |
| 1,514,591 | Smyser | Nov. 4, 1924 |
| 1,514,592 | Smyser | Nov. 4, 1924 |
| 2,183,473 | Burgett | Dec. 12, 1939 |
| 2,393,662 | Skuhrovec | Jan. 29, 1946 |